United States Patent Office 2,808,434
Patented Oct. 1, 1957

2,808,434
PROCESS OF PREPARING 2-HYDROXYNAPHTHALENE-3-CARBOXYLIC ACID

Otto Fritz Schulz, Kurt Burgdorf, and Heinrich Martens, Offenbach (Main), Germany, assignors to Farbwerke Hoechst Aktiengesellschaft vormals Meister Lucius & Bruning, Frankfurt am Main Hochst, Germany, a company of Germany No Drawing. Application September 18, 1953, Serial No. 381,122

Claims priority, application Germany September 27, 1952

3 Claims. (Cl. 260—520)

The present invention relates to an improved process for preparing 2-hydroxynaphthalene-3-carboxylic acid.

The preparation of 2-hydroxynaphthalene-3-carboxylic acid on a technical scale is carried out in such a manner that 2-hydroxynaphthalene is converted into an alkali salt, usually the sodium salt, which in the dry state is reacted with carbon dioxide at temperatures up to about 235° C. The process gives only moderate yields and a great number of suggestions to improve this process have been made; generally, however, no or only vague and unreliable statements with regard to the yield have been given.

Thus, for instance, the statement made in British Patent No. 647,997 that the di-sodium salt of 2-hydroxynaphthalene-1-carboxylic acid can be converted quantitatively into the di-sodium salt of 2-hydroxynaphthalene-3-carboxylic acid, could not be confirmed. The said patent gives as state of the art a yield of 36 to 37%. According to the process described in U. S. Patent No. 2,544,881 a yield of 31.8%, calculated on the employed 2-hydroxynaphthalene or its alkali salt, is obtained. It is within these limits that actually lie the yields of 2-hydroxynaphthalene-3-carboxylic acid hitherto obtainable on an industrial scale.

Now we have found that far higher yields of 2-hydroxynaphthalene-3-carboxylic acid are obtained by conducting the known process for preparing this acid from 2-hydroxynaphthalene by way of an alkali salt thereof, by the action of carbon dioxide in one or more stages of the reaction in the presence of an alkali hydride, preferably sodium hydride. The procedure may be such, that 2-hydroxynaphthalene is treated with an alkali hydride and that the alkali salt of 2-hydroxynaphthalene so obtained is reacted with carbon dioxide, if desired, with the addition of further alkali hydride. It is also possible to cause the alkali salt of 2-hydroxynaphthalene, prepared from 2-hydroxynaphthalene and caustic alkali, to react with carbon dioxide with the addition of an alkali hydride. Higher yields of 2-hydroxynaphthalene-3-carboxylic acid will also be obtained when the carboxylation product, prepared from an alkali salt of 2-hydroxynaphthalene, is mixed with an alkali hydride and then further reacted with carbon dioxide. According to the invention the process can also be carried out in such a manner that not the alkali hydride per se is introduced into the reaction mixture but that it is produced in the mixture by the action of hydrogen upon an alkali metal which has been added to the dry mixture.

The following examples serve to illustrate the invention, but they are not intended to limit it thereto; the parts are by weight.

Example 1

In a rotating autoclave, having a content of two litres and being provided with several crushing balls or rollers, 72 parts of 2-hydroxynaphthalene and 12.4 parts of sodium hydride are ground in a nitrogen atmosphere for one hour at 120° C. and for another hour at 150° C. The gas content of the autoclave is then displaced by carbon dioxide. Carbon dioxide is introduced into the mixture under a pressure up to 5 atmospheres (gauge), and while maintaining 5 atmospheres (gauge), the reaction with carbon dioxide is carried out at an internal temperature of 230–250° C. during 8 hours. The product is worked up in known manner in a wet way.

The yield of 2-hydroxynaphthalene-3-carboxylic acid amounts to 42% of the theoretical, calculated on the employed 2-hydroxynaphthalene.

Example 2

In an autoclave fitted with a strong stirring apparatus, 72 parts of 2-hydroxynaphthalene are reacted in a nitrogen atmosphere with caustic soda solution of 40% strength, corresponding to 20 parts of caustic soda and then dehydrated up to a final temperature of 200° C. After the autoclave has cooled, 1.5 parts of sodium hydride are introduced and well mixed with the alkali salt of 2-hydroxynaphthalene so obtained. The gas content of the autoclave is displaced by carbon dioxide and the product is further worked up as described in Example 1.

Yield: 45% of the theoretical. Similar results are obtained, if caustic potash is used instead of caustic soda.

Example 3

A dry alkali salt is prepared from 72 parts of 2-hydroxynaphthalene. At a temperature of 200° C. the gas content of the autoclave is displaced by carbon dioxide and carbon dioxide is introduced into it under a pressure up to 40 atmospheres (gauge). The temperature is raised to about 235° C. and maintained at this level for 6 hours. After the autoclave has cooled, 9 parts of sodium hydride are introduced. Carbon dioxide is then reacted again with the mixture for 8 hours at about 235° C. under a pressure of 40 atmospheres (gauge).

Yield: 47% of the theoretical.

Similar results are obtained, if potassium hydride or lithium hydride is used instead of sodium hydride.

Example 4

The procedure is the same as described in Example 3, but the carboxylation is carried out under a pressure of only 5 atmospheres (gauge). After the addition of 6 parts of sodium hydride, the carboxylation is terminated at 5 atmospheres (gauge).

Yield: 47% of the theoretical.

Example 5

A dry alkali salt is prepared from 72 parts of 2-hydroxynaphthalene as described in Example 2. After cooling of the autoclave, 1 part of metallic sodium is added, hydrogen gas is introduced under pressure and an internal temperature of 235° C. is maintained for one hour under 10 atmospheres (gauge) hydrogen pressure. The hydrogen atmosphere is then displaced by carbon dioxide and an excess pressure of 10 atmospheres of carbon dioxide is maintained for 6 hours at 235° C. in the reaction mixture.

Yield: 42% of the theoretical.

We claim:

1. A process of preparing 2-hydroxynaphthalene-3-carboxylic acid which comprises subjecting the anhydrous sodium salt of 2-hydroxynaphthalene to an atmosphere of carbon dioxide at a temperature of about 230° C. to 250° C. and under a pressure of about 5 to about 40 atmospheres in the presence of 0.1 to 0.8 mol of sodium hydride per mol of said anhydrous sodium salt.

2. The process of claim 1 wherein the sodium hydride is produced in situ by the reaction of sodium and hydrogen prior to subjecting the anhydrous sodium salt to an atmosphere of carbon dioxide.

3. A process of preparing 2-hydroxynaphthalene-3-carboxylic acid which comprises reacting 2-hydroxynaphthalene and sodium hydride in an inert atmosphere, the molar ratio of sodium hydride to 2-hydroxynaphthalene supplying a stoichiometric excess of sodium hydride, and then subjecting reaction mixture to an atmosphere of carbon dioxide at a temperature of between about 230° C. and about 250° C. and under a pressure of between about 5 and about 40 atmospheres.

References Cited in the file of this patent

UNITED STATES PATENTS

| 410,295 | Schmitt | Sept. 3, 1889 |
| 1,593,816 | Andre | July 27, 1926 |
| 2,685,600 | Morris et al. | Aug. 3, 1954 |

FOREIGN PATENTS

| 647,997 | Great Britain | Dec. 28, 1950 |